United States Patent [19]

Clements

[11] 4,167,896
[45] Sep. 18, 1979

[54] PUMP FOR AUGER TREATER

[75] Inventor: George W. Clements, Minneapolis, Minn.

[73] Assignee: Gustafson, Inc., Eden Prairie, Minn.

[21] Appl. No.: 823,662

[22] Filed: Aug. 11, 1977

[51] Int. Cl.² .......................... F15B 15/24; B05C 7/00; B01F 15/02
[52] U.S. Cl. ...................................... 92/13.2; 92/13.4; 366/161; 118/303
[58] Field of Search ....................... 366/156, 157, 161; 222/190, 413; 221/135; 118/303; 47/DIG. 9; 417/470, 471, 568; 92/13.2, 13.6, 13.7, 13.4; 74/527

[56] References Cited

U.S. PATENT DOCUMENTS

| 3,130,909 | 4/1964 | Sanborn et al. | 417/470 |
| 3,288,071 | 11/1966 | Anderson | 92/13.6 |
| 3,552,219 | 1/1971 | Berg | 92/13.7 |
| 3,768,333 | 10/1973 | Bidereis | 74/527 |
| 3,801,232 | 4/1974 | Kilayko | 92/13.8 |
| 4,023,525 | 5/1977 | Weber | 118/303 |

FOREIGN PATENT DOCUMENTS 535012 10/1955 Fed. Rep. of Germany ........... 366/161

Primary Examiner—William L. Freeh
Attorney, Agent, or Firm—H. Dale Palmatier

[57] ABSTRACT

A positive displacement pump for metering liquid chemicals and applying such chemicals into grains such as seed being conveyed through a screw conveyor, the pump including a reciprocating rod operated by an eccentric cam on the screw conveyor shaft, the pump rod having a shoulder and a stop carried by the housing to limit the length of movement of the rod, the stop being a rotary cam having flat surfaces, of varied distances from the cam axis and controlled by a hand operated knob.

1 Claim, 3 Drawing Figures

PUMP FOR AUGER TREATER

This invention relates to a liquid metering pump and to a variable control therefor.

BACKGROUND OF THE INVENTION

Metering pumps may be piston pumps or diaphragm pumps and are often used to continuously apply measured quantities of liquid into other material being conveyed. For instance, seeds are treated with chemicals which must be very accurately measured for the correct effect.

Such seed may be conveyed by a screw conveyor and small measured quantities of chemical may be applied to the seed being conveyed by the screw auger. The metering pump may be operated in close coordination with the auger shaft.

SUMMARY OF THE INVENTION

This invention relates to an improved variable metering pump, and especially to the control therefor. By a simple turn of a control knob, the length of the stroke is changed so as to vary the quantity of liquid propelled by the positive displacement reciprocating impellor. The pump is operated by an eccentric cam turned by the auger shaft of the screw conveyor. The reciprocating rod, which operates the impellor, lifts off the rotating cam during a portion of each revolution of the cam. Such lift off is effected by simply not allowing the rod to follow the cam face to the low point of the eccentric cam.

The pump rod is restrained by a multiposition rotatable cam which obstructs a shoulder on the rod and prevents spring pressed movement of the piston rod in one direction. The lift off is smooth and does not occur with any shock or significant impact.

DESCRIPTION OF THE DRAWINGS

FIG. 3 is a detail section view taken approximately at 3—3 in FIG. 2.

DETAILED SPECIFICATION

Figure 1:
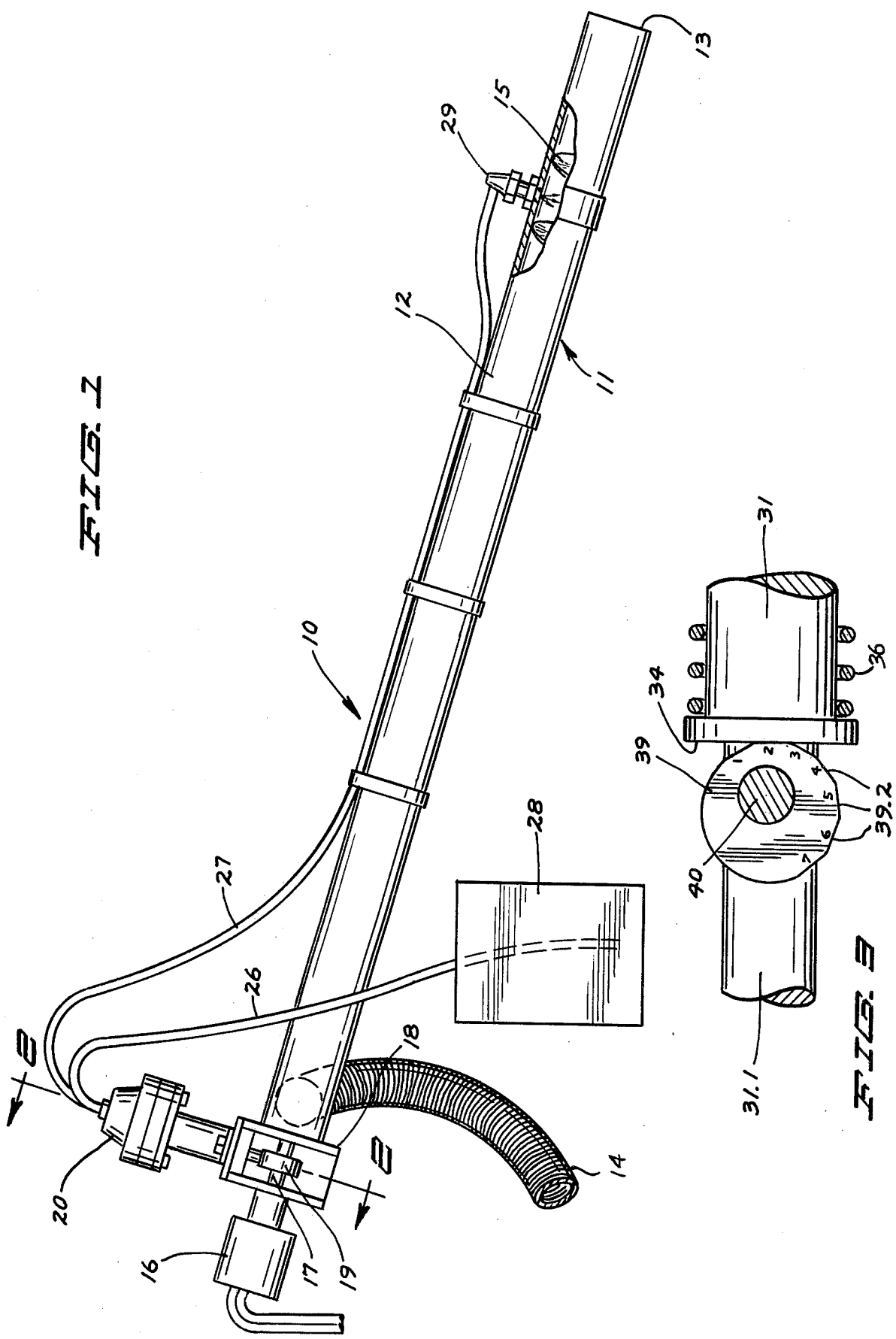
FIG. 1 is an elevation view of an apparatus for applying treating chemicals to seed.
Figure 2:
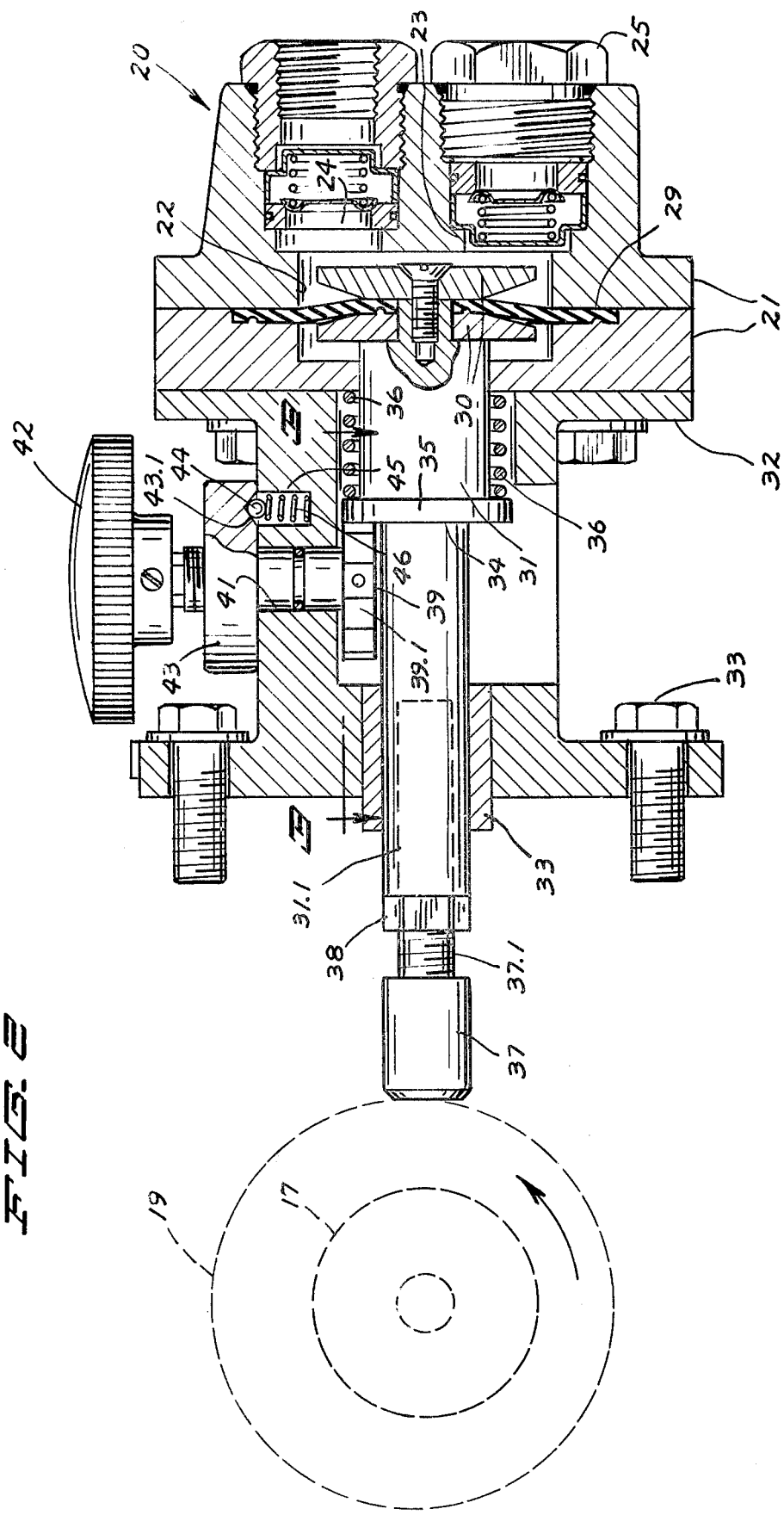
FIG. 2 is an enlarged detail section view taken approximately at 2—2 in FIG. 1 and illustrating the pump detached from the other mechanism.

One form of the present invention is shown in the drawings and is described herein. In FIG. 1, apparatus for conveying seed and applying treating liquid chemical to the seed is illustrated and indicated in general by numeral 10. Such apparatus includes a screw conveyor 11 with a cylindrical housing 12 having an open inlet end 13 and a discharge tube 14 extending transversely of the upper end of the housing. The housing also includes a screw auger 15 extending the full length of the housing 12 and driven by a suitable source of rotary power such as a rotary hydraulic motor 16 mounted on the upper end of the housing 12 and rotatably driving the auger shaft 17 which protrudes from the upper end of the housing 12. A pump mounting bracket 18 is affixed to the upper end of the conveyor housing and surrounds a portion of the auger shaft which mounts an eccentric operating cam 19 to revolve with the auger shaft. The cam 19 has its peripheral edge or side eccentrically related to the rotation axis of the auger shaft so as to vary the spacing of various portions of the periphery from the rotation axis.

The screw conveyor 11 is of the type which is commonly used to unload grain boxes on trucks and other types of vehicles. In some instances the lower end 13 of the housing is simply extended into the supply of grain in the box, and in other instances, the housing may be supported, as by clamps to the sidewalls of the box or to the truck which mounts the box.

A liquid metering pump 20 is attached to the mounting bracket 18 immediately adjacent the eccentric cam 19.

The pump 20 includes a pump housing 21 in which there is defined a pressure chamber 22 having inlet and outlet openings 23 and 24 which are provided with suitable fittings 25 for connection to hoses 26 and 27 which respectively connect the inlet opening with a supply or tank 28 of the liquid chemical, and the hose 27 connects to a fitting 29 on the screw conveyor housing 12 for directing metered quantities of the liquid chemical through an opening in the housing 12 and into the seed confined therein and being conveyed by the auger.

A flexible diaphragm 29 traverses the pressure chamber and is clamped at its periphery to the housing 21. The center of the diaphragm 29 is clamped between a pair of circular discs 30 by which the diaphragm is affixed to the end of a reciprocating operating rod 31 which extends out of the housing 21 and toward the operating cam 19.

The pump housing also incorporates a mounting bracket 32 which is affixed as by screws 33 to the mounting bracket 18 on the screw conveyor housing; and the bracket portion also mounts a bushing 33 in which a reduced portion 31.1 of the reciprocating operating rod slides and is guided. The operating rod 31 has a shoulder 34 between the larger and smaller portions of the operating rod. The shoulder 34 is defined by a flange 35 against which a compression spring 36 bears. The compression spring 36 surrounds the enlarged portion of the operating rod 31 and also bears against a stationary portion of the housing so as to continuously urge the operating rod toward the cam 19.

The operating rod has a cam follower 37 at its remote end, and the cam follower has a threaded stem 37.1 threaded into a tapped opening in the reduced portion 31.1 of the rod and the cam follower is affixed in predetermined relation to the rod 31.1 by a jam nut 38.

A stop cam 39 is affixed to and stationary with an operating shaft 40 mounted in a bearing aperture 41 in the bracket portion 32 of the housing. An operating handle 42 is also affixed on the shaft 40 and protrudes out to the side of the pump to be manually manipulated. A collar 43 is also affixed to the shaft by a set screw and has a plurality of notches 43.1 spaced around the periphery of the side face of collar 43 to cooperate with a ball detent 44 which is captured in an opening 45 in the housing and spring pressed by compression spring 46 toward the collar 43 for cooperating with the several notches 43.1 thereof in retaining the shaft and cam 39 in a predetermined position.

It will be seen that the peripheral camming edge 39.1 of the stop cam 39 confronts and bears against the shoulder 34 of the operating rod 31 so as to limit the movement of the operating rod toward cam 19. The camming edge 39.1 of the stop cam is generally spirally shaped so as to progressively vary the spacing between the camming edge 39.1 and the rotation axis of the mounting shaft 40. It will further be seen that the peripheral camming edge 39.1 has a plurality of flat surfaces 39.2 thereon, each of which is spaced slightly differently from the rotation axis of shaft 40 than are the adjoining flat surfaces 39.2. Each flat surface 39.2 is also oriented at a slight oblique angle with respect to the adjoining flat surfaces so that as the cam is revolved, each of the flat surfaces may successively lie flush against the flat shoulder face 34 of the operating rod.

In order to vary the quantity of liquid chemical being pumped into the seed moving in the screw conveyor, the stop cam is revolved by a handle 42 to various rotary positions.

With the cam 39 in the position illustrated in FIG. 3, the magnitude of reciprocation of the operating rod and the central portion of the diaphragm 39 is significant because the follower 37 is allowed to engage the periphery of the operating cam 19 throughout substantially the entire operating cycle of the cam 19. Accordingly, almost the maximum amount of liquid chemical is pumped by the impellor through the hose 27 and into the seed. The stop cam 39 is held in the particular position by the ball detent 44 in cooperation with the adjoining notches 43.1 in the collar 43.

If the quantity of liquid chemical being pumped for treating the seed is to be reduced, the handle 42 is turned so as to revolve the cam 39 in a direction counterclockwise, as illustrated in FIG. 3, so that one of the other flat surfaces 39.2 will lie flush against the shoulder 34. In this situation, the stop cam 39 limits the movement of the operating rod in a direction toward cam 19 under influence of spring 36 so that during significant portions of the operating cycle of cam 19, the rod 31 is stopped by stop cam 39 from moving any further toward the cam 19 and accordingly, the follower 37 will disengage from the peripheral edge of cam 19 and of course the impellor of the pump will thereupon remain stationary. During a later portion of the operating cycle of the cam 19, the cam will again reengage the cam follower 37 so as to again move the operating rod 31 and the impellor in the opposite direction, tending to expel liquid from the chamber. By reason of the control 42 and effected by stop cam 39, a very fine control of the operating characteristics of pump 20 can be achieved. The pump may be so adjusted that when the flat surface on cam 39 which is farthest from the rotation axis of shaft 40, confronts the shoulder 34, there may be no stroke of the piston at all and therefore there will be no pumping action allowed.

It will be seen that I have provided a new and improved liquid chemical metering pump and apparatus for mixing the chemical metered with seed being moved through a screw conveyor. The pump varies the limit of the reciprocating operating rod so as to limit the amount of liquid being pumped, and the rotary stop cam is provided for the purpose of adjusting the maximum movement of the reciprocating operating rod and impellor of the pump. The stop cam has flat faces on its generally spiral edge so as to lie flush against the shoulder of the operating rod and facilitate ready and easy adjustment of the pump according to the needs of the seed to be treated.

What is claimed is:

1. A liquid metering pump to be operated by a revolving eccentric cam, comprising a stationary pump housing defining a pressure chamber having an inlet and an outlet, a reciprocating impellor in the housing and having an outwardly extending operating rod with a flat-surfaced shoulder lying substantially normal to the rod and facing away from the impellor, the rod having an end portion of reduced diameter extending from the shoulder and slidably guided on the housing, a cam follower on the end of said reduced end portion of the rod and remote from the impellor and adapted to engage such a revolving eccentric cam, a spring urging the impellor and rod in the direction of said one end to urge the cam follower toward the eccentric cam, and a rotatable stop cam having a camming edge facing the shoulder of the operating rod, the camming edge having a plurality of flat surfaces to individually confront and engage the shoulder of the operating rod to obstruct movement of the rod under influence of the spring, the stop cam being rotatably mounted on the stationary pump housing and on a rotation axis extending transversely of the rod, and the stop cam confronting the reduced end portion of the rod in closely spaced relation therewith, and the camming edge of the stop cam progressively varying in spacing from the rotation axis and each of the flat surfaces of the camming edge being oriented at an oblique angle with respect to adjoining surfaces and each of said flat surfaces being spaced from the rotation axis slightly differently than adjoining surfaces, a rotatable operating handle connected with the stop cam for turning the cam and progressively orienting various flat surfaces of the camming edge into confronting relation with the shoulder on the operating rod, and means releasably retaining the stop cam against rotation whereby to maintain a particular flat surface of the stop cam in confronting relation with the shoulder, the retaining means including a detent ball captured in an opening in the housing and bearing against a notched rotor connected with the cam, the notches in the rotor being coordinated with the position of the flat surfaces of the stop cam whereby the flat surfaces of the cam will bear flush against the flat-surfaced shoulder on the rod.

* * * * *